United States Patent Office

3,698,951
Patented Oct. 17, 1972

3,698,951
SUGAR REFINING
Michael Camm Bennett, London, England, assignor to Tate & Lyle Limited, London, England
Continuation-in-part of application Ser. No. 761,738, Sept. 23, 1968. This application July 17, 1970, Ser. No. 55,723
Claims priority, application Great Britain, Sept. 29, 1967, 44,594/67
Int. Cl. C13d 3/00; C13f 1/14
U.S. Cl. 127—48          12 Claims

ABSTRACT OF THE DISCLOSURE

Sugar liquor is purified by adding cationic surfactants (especially long chain ammonium quaternaries) precipitating a floc. The process combines synergistically with conventional phosphatation and/or carbonatation treatment.

---

Figure 1:
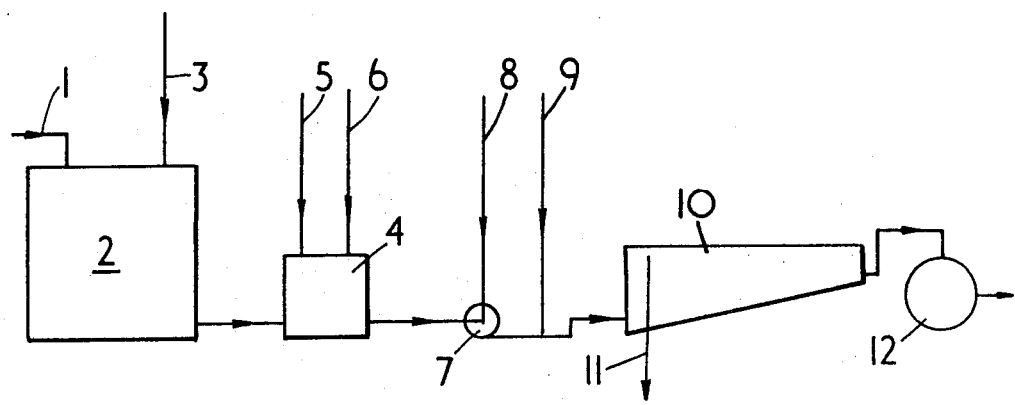

This application is a continuation-in-part of my application Ser. No. 761,738 filed on Sept. 23, 1968, now abandoned.

This invention relates to the purification of sugar syrups and liquors by a process in which color and other impurities are precipitated.

The sugar industry distinguishes between two products: namely, raw sugar and refined sugar. Raw sugar is manufactured from raw juice by the processes of clarification, evaporation to a thick syrup, and crystallization. If special processing is introduced into these stages, the crystallized product can reach a standard suitable for direct consumption: such products are known as Mill White or Plantation White Sugars. Generally, however, raw sugar must be refined before it reaches an acceptable standard of purity.

In the conventional sugar refining process, raw sugar is first washed and centrifuged to remove adherent syrup, and the affined sugar so produced is dissolved in water as "melter liquor." The melter liquor is then purified in two successive steps, the first of which is termed "defecation" and prepares the liquor for the second, which is termed "decolorization." The liquor produced by these successive steps is termed "fine liquor;" and refined sugar is obtained from fine liquor by crystallization. When a relatively low quality refined sugar product is required, the decolorization step may be omitted altogether.

The defecation step may comprise simple filtration through a bed of diatomaceous earth or an other suitable filter aid; but, more generally, defecation involves an inorganic precipitation reaction, whereby insoluble and colloidal impurities are removed along with the inorganic precipitate. The inorganic precipitate employed may be calcium carbonate, formed by dissolving lime in the melter liquor and introducing carbon dioxide (for example, in flue gas), which causes the in situ precipitation of calcium carbonate: this is called the "carbonatation process" and the precipitate, which contains various impurities, is removed by filtration, the calcium carbonate acting as its own filter aid. Alternatively, the inorganic precipitate may be calcium phosphate, formed by the addition of, for example, lime and phosphoric acid. This precipitate can be removed by filtration, but large quantities of filter aid are required: consequently, it is more common to remove the calcium phosphate precipitate by flotation, in association with air bubbles. Processes which make use of calcium phosphate are termed "phosphatation processes."

Many chemical additives have been recommended to aid the flotation separation of the phosphatation precipitate. For example, high molecular weight anionic polymers of the polyacrylamide type are used as flocculating agents, and these increase the size of the floc and the retention of air bubbles within the floc. Activated natural earths, for example bentonite, have also been used to increase the degree of flocculation and hence aid the separation of the precipitate.

A third inorganic precipitate occasionally used for defecation is calcium sulfite, formed by the introduction of sulfur dioxide into limed melter liquor; the calcium sulfite is then removed by filtration, as in the carbonatation process. This process, which is termed "sulfitation," is often used in conjunction with carbonatation; and, because of the special effect of sulfur dioxide in preventing color formation during the subsequent processing of the sugar liquor, a separate decolorization process is seldom necessary with this particular combination of defecation treatments.

When used, the decolorization step is carried out by percolating the defecated liquor through cisterns of adsorbant material. Adsorbants commonly employed are bone charcoal or granular carbon; but, in recent years, ion-exchange resins have found an increasing application for this purpose, either alone or in conjunction with a carbonaceous adsorbent. An alternative decolorization process uses powdered activated adsorbent carbon, which is mixed with the defecated liquor and, after a suitable contact time, is removed by filtration, using a filter aid.

As a result of basic research work into the nature of the impurities removed during sugar refining, I have found that the defecation and decolorization processes are characterized by their ability to remove high molecular weight anionic impurities. The impurity material is strongly hydrophillic and much of it is highly soluble in water: it is removed by specific attachment to the defecation or decolorizing agent. Thus, the carbonatation process tends to remove any impurity which can form a sparingly soluble calcium salt; and the impurities, for example anionic colorant molecules, are incorporated within the calcium carbonate precipitate. Bone char has a specific affinity for anionic color because it is composed largely of hydroxyapatite, which acquires a positive electrical charge by adsorption of calcium ions and, consequently, has a tendency to adsorb negatively charged anionic color to preserve electrical neutrality. With granular or powdered carbons, the special oxidation procedures used during their activation generate a carbon surface with an affinity for anionic impurities.

During the course of this basic research work, I have made the surprising and unexpected discovery that a large part of the anionic high molecular weight impurities can be precipitated from solution in the liquor by the addition of certain cationic surfactants. I have studied the relationship between the molecular structure of the cationic surfactant and its ability to precipitate impurity, with particular reference to anionic colorant molecules. I have found the important requirements to be, firstly, a strongly cationic functional group, which allows thefi rm attachment of the surfactant molecule to the anionic impurity molecule; and, secondly, a long hydrocarbon chain, which confers hydrophobic characteristics, and hence insolubility, on the impurity. The most effective cationic surfactants which have been found are long hydrocarbon chain quaternary ammonium compounds.

It is an object of the present invention to provide an effective process for removing color and other impurities from sugar syrups and liquors. Another object of the invention is to provide a process whereby color and other impurities can be removed from sugar liquors and syrups in the form of a flocculant precipitate, without the need for any further defecation and decolorization. Yet another object is to provide a process for removing color and other impurities from sugar liquors and syrups, which can be used in conjunction with known defecation and decolorization processes, to produce an improved result.

Still further objects and advantages will appear from the following description of my invention.

In accordance with my invention, there is provided a process for purifying a sugar liquor, which comprises forming a precipitate in the liquor by incorporating a cationic surfactant therein, and separating the precipitate from the liquor.

The preferred surfactants are the dialkyldimethyl quaternary surfactants, especially the dioctadecyl and dihexadecyl dimethylammonium chlorides, which are commercially available under various trade names. In general, most quaternary ammonium compounds of the form $R_1R_2(CH_3)_2NX$ are effective additives, wherein $R_1=R_2$ or $CH_3$, $R_2=C_8H_{17}$, $C_{10}H_{21}$, $C_{12}H_{25}$, $C_{14}H_{29}$, $C_{16}H_{33}$, $C_{18}H_{37}$, benzyl, etc.; and X=halide. Pyridinium salts are also effective. Such compounds are known articles of commerce, and are available under various trade names. A particularly effective and preferred surfactant is that available under the name "Talofloc" (a trademark of Tate & Lyle Ltd., London, England, used for decolorizing agents supplied to the sugar industry), which is a dialkyldimethyl ammonium chloride containing approximately 60% of dioctadecyl and 35% of dihexadecyl. Various long alkyl chain surfactants containing tertiary nitrogen are also effective, particularly the heterocyclic compounds of the ethoxyethylated glyoxalidine type.

The cationic surfactants are effective in raw sugar syrups, in solutions of raw sugar, in melter liquor and, indeed, in all process liquors containing anionic high molecular weight impurities. The reaction between the added surfactant and the impurity is ionic and, consequently, immediate. The precipitate formed in this reaction is initially very finely divided and cannot be detected with the naked eye; but its presence can be revealed by measurement of the optical properties of the liquor, for example by measuring the optical density at 420 nm., using a spectrophotometer.

In accordance with one embodiment of the invention, the precipitate can be removed simply by filtration, but the porosity of the filter medium used must be small enough to retain the precipitate. Thus, the precipitate can be removed by membrane filtration, using membranes with a pore diameter of less than 0.5 µm. Alternatively, the precipitate may be removed using conventional diatomaceous filter aids, provided their leakage pore diameter is less than 0.5 µm. If samples of liquor containing the added cationic surfactant are allowed to stand, a black flocculant precipitate becomes visible to the naked eye after a few days. The visible floc has a very loose structure and it is easily broken down to its constituent precipitate particles; for this reason, the removal of the black flocculant precipitate by filtration still requires that the leakage pore diameter of the filter medium must be less than 0.5 µm.

The liquor obtained by filtration after treatment with the cationic surfactant is found to be decolorized to an extent which depends upon the quantity of surfactant employed. In some cases, the precipitation is so effective that treatment with the cationic surfactant can be employed as the sole purification treatment, and further defecation and decolorization processes are unnecessary prior to crystallization of a refined sugar product. However, because of the fineness of the filter medium required to separate the precipitated impurity, the filtration rate of the sugar liquor filtrate tends to be slow and a large filtration area would be required to obtain a satisfactory throughput of liquor.

Although, as I have already described, my invention can be used to purify sugar liquors simply by filtering off the precipitate produced by the cationic surfactant, I have discovered that the removal of the precipitated impurity can be markedly improved when the addition of the cationic surfactant is combined with a conventional defecation treatment involving an inorganic precipitate—for example, with the conventional carbonatation or phosphatation processes. The inorganic precipitate acts as a scavenger system, collecting together not only the impurity precipitate but also the other insoluble impurities normally removed by the conventional processes. When the invention is used in this way, it is very convenient simply to add the cationic surfactant to the melter liquor and to pass the liquor directly to the conventional defecation process, without modifying the process in any other way. It will be apparent that this constitutes a major advantage of my invention, in that it can be applied to a sugar refinery without any major modification to the existing plant, the only additional equipment required being a dosing pump to deliver the surfactant into the melter liquor.

When the process of my invention is used in a refinery employing the carbonation process, carbonation can be carried out in a conventional manner, with a lime addition in the range of about 0.2% to about 2.0% by weight of CaO on the basis of liquor solids. The impurity precipitate produced by the addition of the cationic surfactant is filtered off simultaneously with the normal calcium carbonate precipitate. An incidental but important advantage arising from the use of the invention is that, if the cationic surfactant is dosed into the carbonation tank, the subsequent filtrability of the precipitate is improved by up to 100% over the filtrability of the conventional calcium carbonate precipitate formed when no surfactant is used.

When the invention is used in a refinery employing the phosphatation process, phosphatation can be carried out in a conventional manner, with a phosphate addition in the range of about 0.005% to 0.05% by weight of $P_2O_5$ based on the liquor solids. Where filtration is the sole means of separating the calcium phosphate precipitate, the addition of cationic surfactant to precipitate anionic impurities is found to cause a marked reduction in filtrability, and substantially larger quantities of filter aid would have to be used. In phosphatation processes where flotation is the main method of removing the calcium phosphate precipitate, it is necessary to aerate the floc, for example by using an air bleed to a centrifugal pump. In the presence of cationic surfactants, particularly the dialkyl quaternary ammonium compounds, aeration of the floc is improved, a principle known and made use of in the mineral ore flotation processes. However, the floc system is stabilized as a dispersion of fine floc particles, and this leads to inferior flotation properties with incomplete separation of impurity, especially at low additions of the surfactant. This effect can be completely overcome by the use of anionic polymer flocculants, such as those which are recommended for use in the sugar industry for improving the degree of flocculation in phosphatation systems. Moreover, I have discovered that the effect of such polymeric anionic flocculants is markedly improved in the presence of the cationic surfactant, and very rapid and complete flotation can be achieved. It is believed that a special mode of cooperation exists between the cationic surfactant and the (oppositely-charged) anionic polymeric flocculant. Flocculants found to be particularly effective for use in conjunction with the present invention are partially hydrolized polyacrylamides, for example those available under the trade names Magnafloc LT25, Sedipur TF 2, Nalfloc 675 and Polyteric S1. Such flocculants are generally effective at concentrations up to about 50 parts per million based on solids in the liquor, but in practice the rate of addition will generally lie within the range of from 1 to 10 parts per million. The improvement achieved is such that the retention time in the flotation clarifier can be reduced from the normal period of about one hour to less than 20 minutes. The clarity of the liquor so produced is such that a polish filtration operation is seldom essential: however, the normal polish filtration, which is conventionally used after flotation clarification, is recommended as a safeguard to ensure maximum clarity and maximum decolorization of the liquor.

Figure 5:
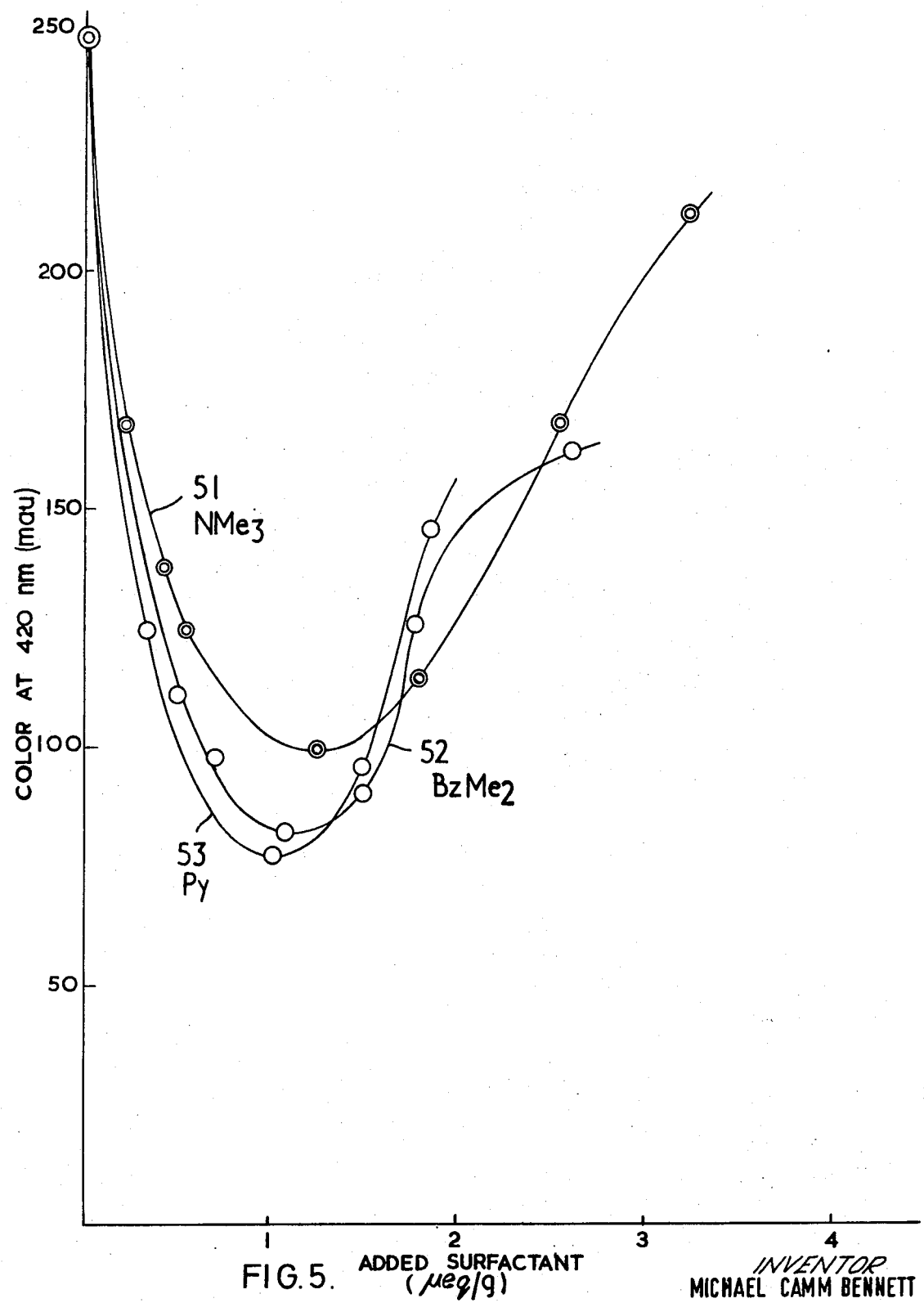
Figure 6:
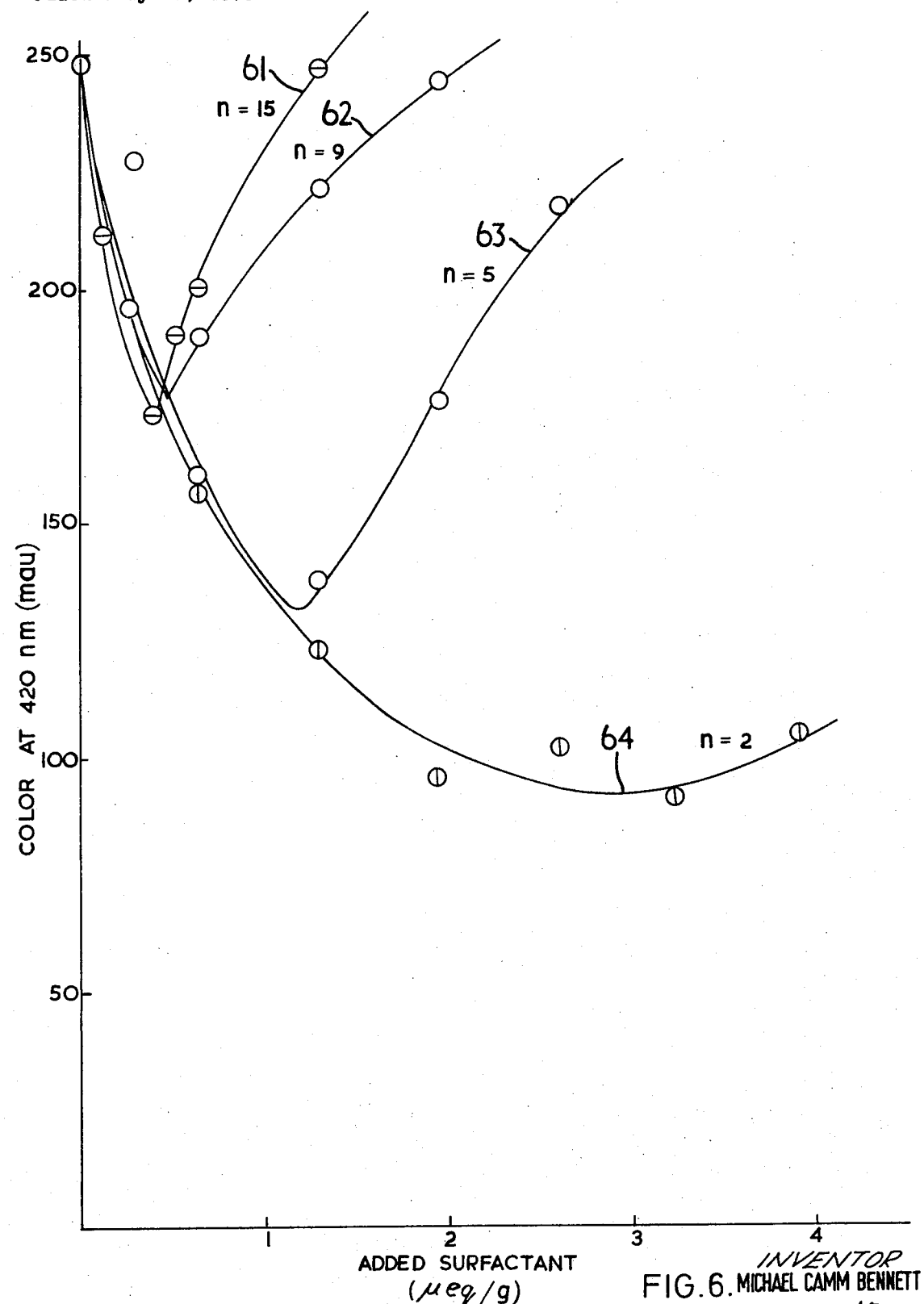
Figure 7:
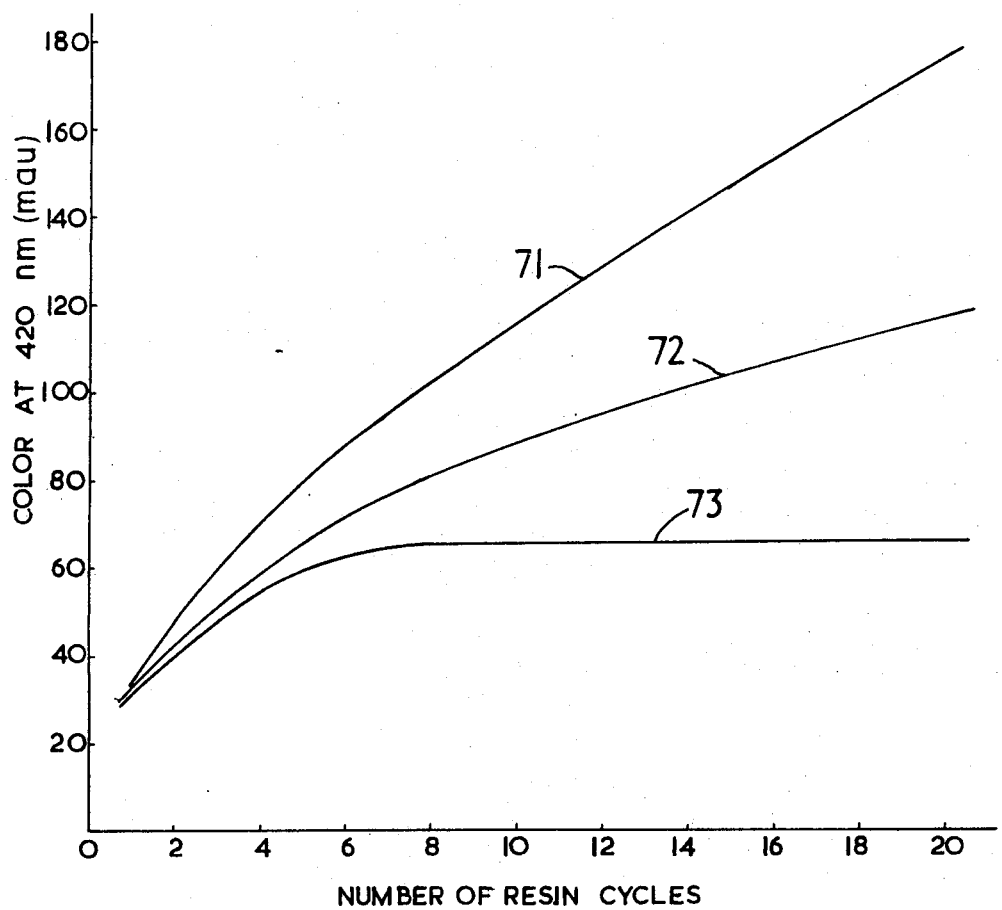

For a better understanding of the invention, reference is made to the accompanying drawings, wherein FIG. 1 is a flow sheet for a simple arrangement whereby the precipitation process of the present invention is used in conjunction with a conventional phosphatation/flotation process, FIGS. 2–6 are graphs showing the effectiveness of various techniques for removal of impurities, and FIG. 7 shows the effect of using cationic surfactants on subsequent decolorization using ion-exchange resins.

Referring particularly to FIG. 1, the impure liquor which is to be treated is fed along line 1 into a buffer storage tank 2, wherein it is dosed with the cationic surfactant flowing in through line 3, causing precipitation of impurities in the liquor. The liquor containing precipitated colorant impurities then flows from tank 2 into the phosphatation reactor 4, where it is treated with lime and phosphoric acid flowing in through lines 5 and 6. The liquor leaving the phosphatation reactor passes to a centrifugal pump 7 fitted with an air bleed 8 on the inlet side, so as to aerate the liquor. On emerging from the centrifugal pump, the liquor is dosed with anionic flocculant through line 9, and subjected to just sufficient mixing to ensure dispersion of the flocculant in the liquor but not enough agitation to destroy the floc. The liquor, now containing large aerated flocs, next flows into a conventional flotation clarifier 10. In the clarifier, the scum floats to the surface of the liquor and is separated down line 11, while clarified and decolorized liquor passes to the filter 12, from where it is taken to other conventional steps in the refining process.

The factors controlling the amount of cationic surfactant used in the invention are as follows:

(a) The initial color of the liquor to be treated;
(b) The quality of fine liquor required;
(c) The extent to which the action of the cationic surfactant is augmented by the simultaneous use of other defecation treatments, such as carbonation or phosphatation;
(d) The extent to which powdered carbon is used in conjunction with the defecation process; and
(e) The extent to which use will be made of subsequent conventional decolorization processes, for example bone charcoal, granular carbon and ion-exchange decolorizing resins.

In particular, rather more surfactant will be needed if the intention is to produce directly, or with nothing more than a polish filtration, liquor suitable for boiling to give a refined solid product. In such a case, the surfactant addition will generally lie within the range of about 0.02% to about 0.2% on sugar solids. On the other hand, rather less surfactant will be needed if the intention is to prepare sugar liquor for some other major decolorization treatment, in which case surfactant addition will generally lie in the range of about 0.005% to about 0.05% on sugar solids. Thus, it may be stated as a general rule that the amount of cationic surfactant will depend upon practical and commercial factors, such as the nature of the liquor being treated and the level of decolorization required. In most instances, suitable amounts will be in the range of about 0.005% to about 0.5% on sugar solids; however, these figures must not be regarded as absolute limits, and surfactant levels as high as 2% or more might be required in special circumstances when treating low purity syrups.

Whereas it is not practicable to state the optiumum operating conditions for every possible combination of surfactant and other process parameters, general guide lines for various classes of surfactants are given below and in the detailed examples which follow. A reader skilled in the sugar refining art will be able to modify process conditions to suit other cationic surfactants which may be commercially available from time to time, and to suit the conditions prevailing in any particular sugar processing plant, without departing from the spirit and scope of my invention.

With cationic surfactants of the monoalkyl type or dialkyl type, in which the hydrocarbon chains are relatively short, the quantity of anionic colorant impurity which can be precipitated increases with increasing addition of surfactant up to a maximum value. Further additions of surfactants of these types will lead to redissolution of the precipitated colorant impurity, by a process analagous to micellization. This effect is not shown by cationic surfactants of the dialkyl type in which the hydrocarbon chains contain more than 12 carbon atoms; and, with this type, increasing additions of the surfactant are always accompanied by increasing precipitation of the colorant impurity. These effects are illustrated with reference to specific surfactants in FIG. 2 of the accompanying drawings, which is constituted by a set of graphs showing color removal by a conventional phosphatation treatment, by treatment with a cationic surfactant and filtration in accordance with the invention, and by a combined treatment with cationic surfactant and phosphation in accordance with the invention.

Figure 2:
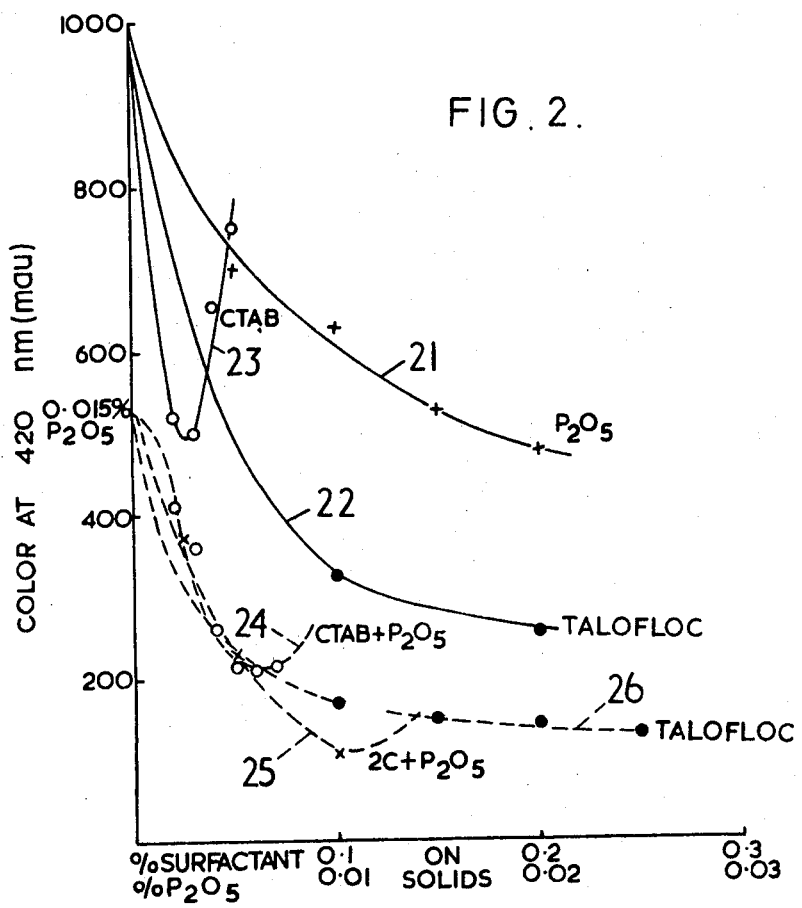

The results shown in FIG. 2 were obtained using a liquor prepared from Mauritius affined sugar, with a concentration of 65° Brix. In the graphs, the color of the liquor is expressed in milliabsorbancy units (1,000 times the optical density of the liquor at 420 nm., with a path length of 1 cm. and a sugar concentration of 1 gm. per ml.), plotted against the concentration of surfactant or phosphoric acid (expressed as $P_2O_5$) calculated as a percentage on the basis of liquor solids. The liquor was adjusted to pH 7.5 in each case before the color measurement.

Referring to FIG. 2, curve 21 shows the effect of phosphatation alone and tends to level off in this particular liquor at about 50% color removal. Curve 22, which shows the effect of the surfactant Talofloc alone, tends to level off at about 75% color removal and gives increasing decolorization with increasing additions of the surfactant. By way of contrast, it will be seen from curve 23 that the use of cetyl trimethyl ammonium bromide gives up to about 50% decolorization at low levels of surfactant, but increasing the amount of surfactant tends to redissolve the precipitate. Curve 24 illustrates the effect of using a combination of cetyl trimethyl ammonium bromide and phosphatation (corresponding to 0.02% $P_2O_5$ on liquor solids). Curve 25 shows the results of using the surfactant Arquad 2C (a di-short chain alkyl dimethyl ammonium chloride) in combination with phosphatation (0.02% $P_2O_5$ on liquor solids): again, the presence of short hydrocarbon chains in the surfactant results in a tendency to redissolve the precipitate with increasing concentrations of surfactant. This can be contrasted with curve 26, showing a combination of the preferred surfactant Talofloc with phosphatation (0.02% $P_2O_5$ on liquor solids), this surfactant containing about 60% of dioctadecyl and 35% of dihexadecyl groups: it will be seen that curve 26 shows continuing decolorization with increasing addition of surfactant. The combination of the preferred surfactant Talofloc with phosphatation can be seen from the graph to give a total decolorization of up to about 87%.

Further guidance to the skilled reader is given in FIGS. 3 to 6 of the accompanying drawings, which show the levels of decolorization achieved by using four different classes of quaternary cationic surfactants in combination with a conventional phosphatation treatment. The figures show curves obtained by plotting the color of the treated liquor (measured in the same units as in FIG. 2) against concentration of added surfactant (expressed in microequivalents per gram of liquor solids). The practical details of the experimental runs in which these results were obtained will be found in Examples 7 to 10 below.

Figure 3:
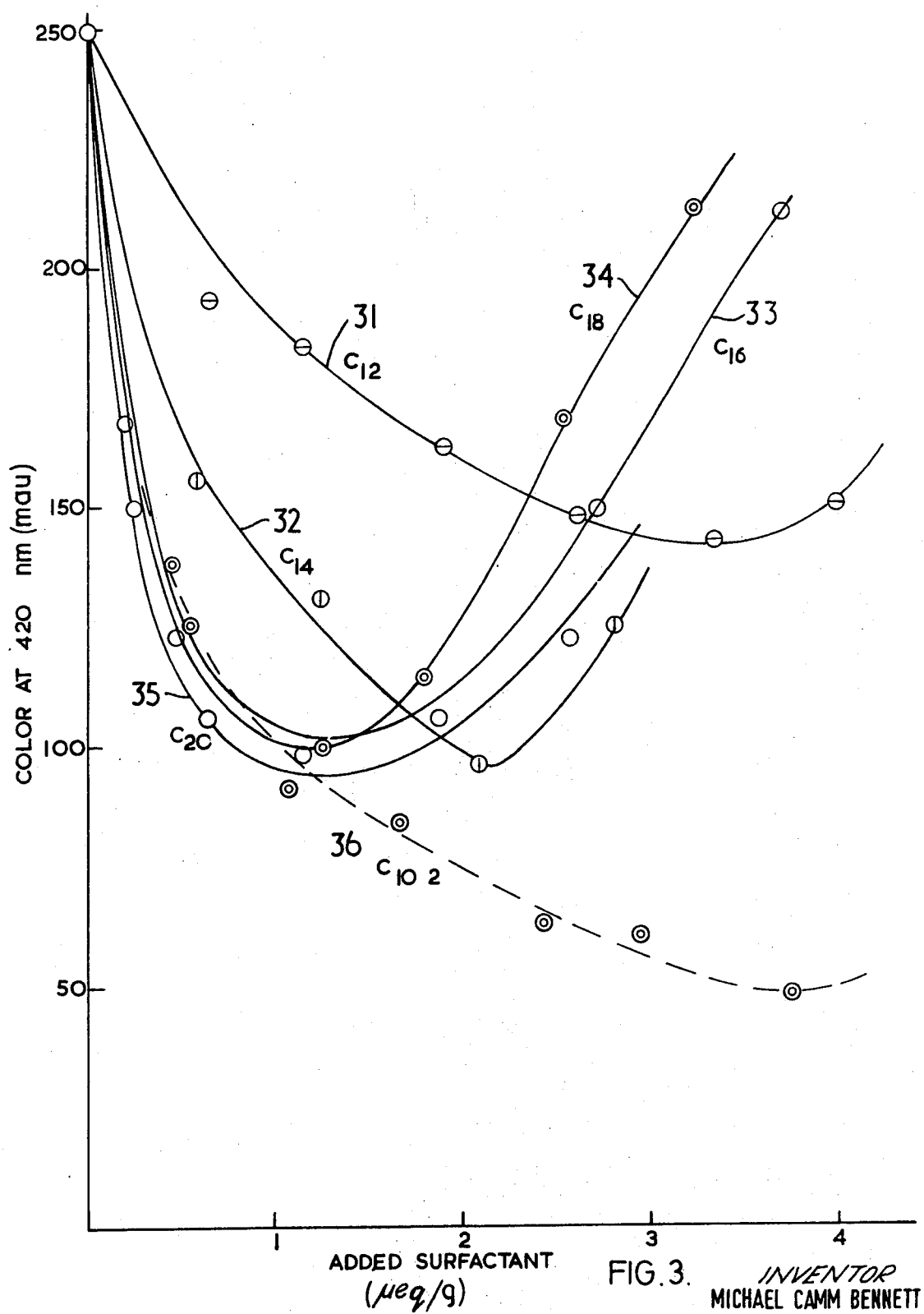

FIG. 3 shows results obtained with five different n-alkyl trimethyl ammonium bromides, in which the alkyl group had a straight chain of the following lengths, respectively:

Curve 31—12 carbon atoms
Curve 32—14 carbon atoms
Curve 33—16 carbon atoms
Curve 34—18 carbon atoms
Curve 35—20 carbon atoms.

Also on FIG. 3, for purposes of comparison, curve 36 shows the results obtained with a surfactant having two hydrocarbon chains, namely didecyl dimethyl ammonium bromide. It will be seen that, for the single long chain quaternaries, decolorizing activity generally increases with chain length, but this effect is very small with lengths of over 16 carbon atoms. Also, as previously stated, these monoalkyl surfactants tend to redissolve the precipitate at increased surfactant concentrations. On the other hand, the didecyl compound shows a greater degree of decolorization at high concentrations, although the hydrocarbon chains are still small enough for redissolution eventually to begin.

Figure 4:
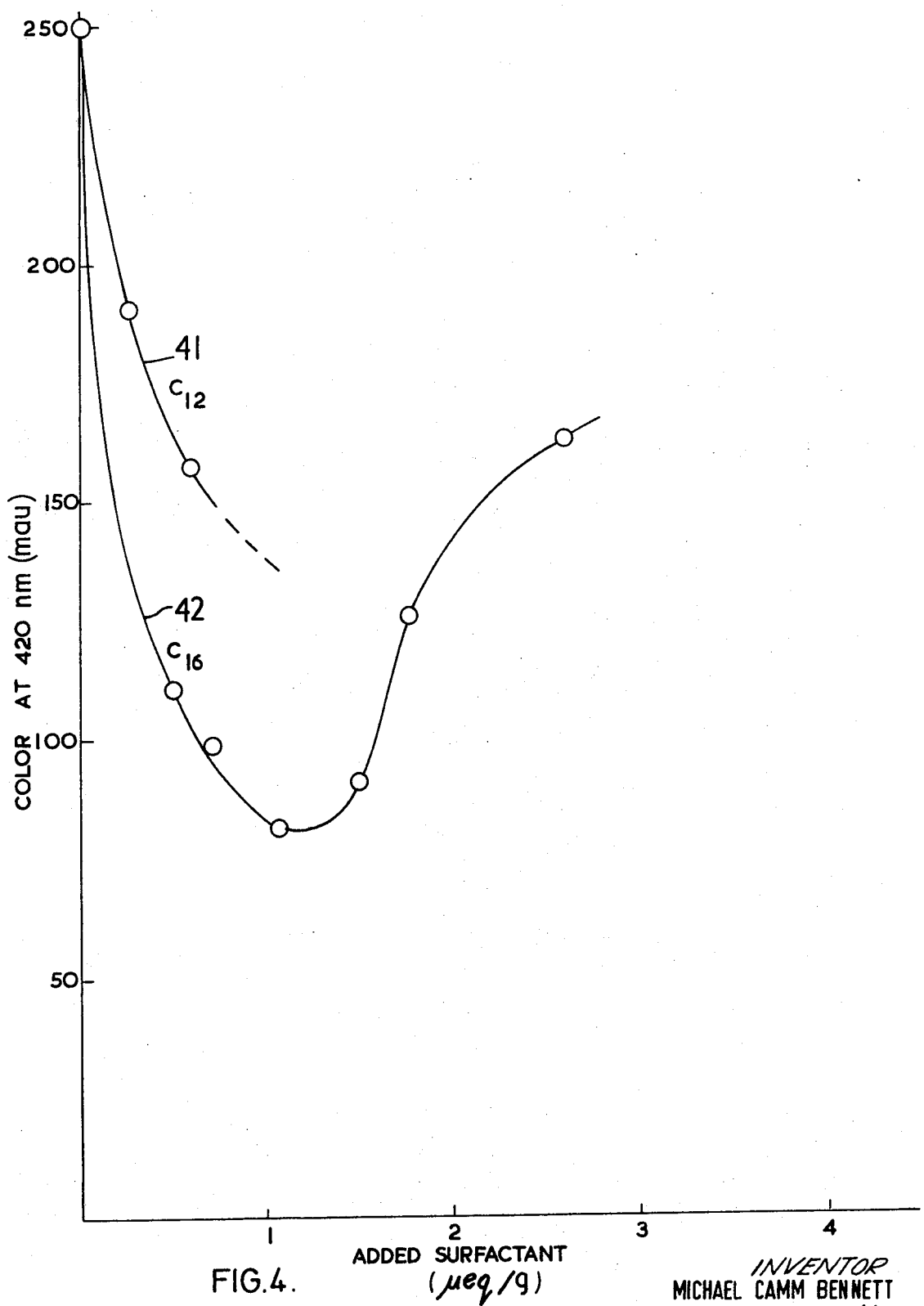

FIG. 4 shows results obtained with two n-alkyl benzyl dimethyl ammonium chlorides. Curve 41 is in respect of the compound wherein the alkyl group contains 12 carbon atoms; and curve 42 is in respect of the compound wherein the alkyl group contains 16 carbon atoms. The results are broadly analagous with those shown in FIG. 3.

In FIG. 5, results are compared of using three different quaternaries, all of which carry a hexadecyl n-alkyl chain, but in which the other substituents on the quaternary nitrogen atom are different. The compounds used are cetyl trimethyl ammonium bromide (curve 51), cetyl benzyl dimethyl ammonium bromide (curve 52), and cetyl pyridinium bromide (53). As may be expected from their similar chemical structures, the behaviour of the last two compounds is very similar.

FIG. 6 shows results obtained with a range of ethoxylated octadecyl quaternaries. These compounds are commercially available as the ethosulfate salts, with a wide range of hydrophilic ethylene oxide chain lengths. The effect of altering the chain length $(EtO)_n$ in an otherwise unchanged molecule was tested, for values of $n=15$ (curve 61), $n=9$ (curve 62), $n=5$ (curve 63), and $n=2$ (curve 64). It will be apparent that the degree of decolorization increases with a decrease in the hydrophilic ethylene oxide chain length and a consequent increase in the lipophilic character of the surfactant.

Taken together, FIGS. 3 to 6 show that the activity of the surfactant as a color precipitant increases with its lipophilic character, which depends not only upon the alkyl chain length but also upon the nature of any other substituents. The figures also show the tendency of surfactants having a relatively low number of alkyl carbon atoms to redissolve precipitated impurity as the surfactant concentration is increased.

It is an important feature of the invention that the precipitation of anionic colorant impurities, using the cationic surfactants either alone or in conjunction with a conventional defecation process, followed by separation of the precipitated impurities, can be used to remove those impurity constituents which would otherwise foul an ion-exchange decolarization resin. When ion-exchange resins are used to decolorize sugar liquors which have previously been treated with the cationic surfactant, it is found that the total volume of decolorized liquor which can be obtained from each cycle of resin used is greatly increased; and the total number of decolorization and regeneration cycles for which the resin can be used is correspondingly greatly increased. The reason for this effect is that the active centres on such ion-exchange resins are themselves strong cationic groups, for example quaternary ammonium groups, which tend to become blocked by colorant impurities if these impurities are not removed before the liquor is passed through the resin.

The invention is illustrated by the following examples, in which parts and percentages are given by weight unless otherwise specified. In order to assist in the identification of surfactants referred to in the examples, the following key is given to show the active chemical constituents of the surfactants:

KEY TO CATIONIC SURFACTANTS USED IN THE EXAMPLES

| Trade name | Active constitutent |
|---|---|
| Talofloc | Dialkyl (60% dioctadecyl, 35% dihexadecyl) dimethyl ammonium chloride. |
| Bitran H | $C_{18}H_{37}-C\underset{N}{\overset{N}{\diagup\diagdown}}CH_2$, $CH_2NH_2$ |
| Bitran HDA | Diacetyl derivative of Bitran H. |
| Catafor and Ethomeen | $R-N\underset{(CH_2CH_2O)_yH}{\overset{(CH_2CH_2O)_xH}{\diagup\diagdown}}$ Catafor O2: R=oleyl; $x+y=2$; Catafor O5: R=oleyl; $x+y=5$; Ethomeen 18/60: R=stearyl; $x+y=50$. |
| Gemex 220 | 1-hydroxyethyl-2-heptadecanyl glyoxalidine. |
| Gemex G | Alkylated N,N-diethylethanolamine. |
| Gemex Z-11 | Polyamine reacted with palm kernel fatty acid and quaternized with dimethyl sulfate. |
| Morpan CPB | Cetyl pyridinium bromide. |
| Morpan CW | $C_{18}/C_{16}$ carboxymethyl trimethyl ammonium chloride. |

It will be appreciated that in many cases the materials described under the above trade names are products of complex reactions and are therefore multi-component mixtures.

EXAMPLES 1–5

Laboratory phosphatation/flotation using Talofloc

These examples illustrate the advantages of using cationic surfactant treatment in conjunction with phosphatation in accordance with the present invention as compared with conventional phosphatation.

Five different raw sugars, as shown below in Table 1, were affined by conventional methods, and then dissolved in water to give solutions of about 65° Brix. 4 runs were carried out on each sugar, first with phosphatation alone, then at two different concentrations of Talofloc, and finally with the addition of 0.2% of powdered carbon. In each run, the solution was heated to 75° C. and the specified amount of Talofloc (if any) added. Phosphoric acid was then added with vigorous stirring, and the mixture was brought to pH 8.0 with milk of lime. After allowing the floc to rise, the subnatant liquor was filtered through a pad of kieselguhr with a pore leakage diameter of 0.4 μm., to give a clear liquor. In the runs indicated in Table 1, 0.2% of powdered active carbon was added to the liquor before flotation.

The color of the filtered liquor was measured at 420 nm., and is expressed in Table 1 in milliabsorbancy units. Control runs were also carried out on each of the sugars, without any defecation or decolorization treatment, in order to measure the color of the untreated liquor. The percent decolorization for each run was calculated on the basis of the color of the untreated liquor.

TABLE 1

| Example | Sugar origin | Run | Phosphoric acid (percent $P_2O_5$ on solids) | Talofloc (percent on solids) | Color, mau. | Decolorization, percent |
|---|---|---|---|---|---|---|
| 1 | Australian Sugar (A) | Control | Untreated liquor | | 1,113 | |
| | | 1 | 0.02 | None | 676 | 39 |
| | | 2 | 0.02 | 0.02 | 406 | 64 |
| | | 3 | 0.02 | 0.05 | 290 | 74 |
| | | 4 | 0.02 | 0.05 | 138 | 88 |
| | | | Plus 0.2% active carbon | | | |
| 2 | Australian Sugar (B) | Control | Untreated liquor | | 989 | |
| | | 1 | 0.02 | None | 590 | 40 |
| | | 2 | 0.02 | 0.02 | 315 | 68 |
| | | 3 | 0.02 | 0.05 | 227 | 77 |
| | | 4 | 0.02 | 0.05 | 158 | 84 |
| | | | Plus 0.2% active carbon | | | |
| 3 | West Indies Sugar (A) | Control | Untreated liquor | | 1,090 | |
| | | 1 | 0.02 | None | 562 | 48 |
| | | 2 | 0.02 | 0.02 | 353 | 68 |
| | | 3 | 0.02 | 0.05 | 223 | 80 |
| | | 4 | 0.02 | 0.05 | 132 | 88 |
| | | | Plus 0.2% active carbon | | | |
| 4 | West Indies Sugar (B) | Control | Untreated liquor | | 1,223 | |
| | | 1 | 0.02 | None | 692 | 44 |
| | | 2 | 0.02 | 0.02 | 449 | 63 |
| | | 3 | 0.02 | 0.05 | 298 | 76 |
| | | 4 | 0.02 | 0.05 | 113 | 91 |
| | | | Plus 0.2% active carbon | | | |
| 5 | Mixed: 75% Mauritius, 25% Beet | Control | Untreated liquor | | 1,267 | |
| | | 1 | 0.02 | None | 684 | 46 |
| | | 2 | 0.02 | 0.02 | 426 | 66 |
| | | 3 | 0.02 | 0.05 | 304 | 76 |
| | | 4 | 0.02 | 0.05 | 167 | 87 |
| | | | Plus 0.2% active carbon | | | |

EXAMPLE 6

Laboratory Phosphatation/flotation

This example compares the activity of four different cationic surfactants as decolorizing agents, in combination with a conventional phosphatation treatment.

The liquor was prepared from a raw sugar containing 60% Mauritius and 40% beet sugar. The phosphatation, flotation and polish filtration procedures of Examples 1 to 5 were repeated, using 0.02% $P_2O_5$ and 0.02% of each surfactant on the basis of the liquor solids. In addition, 0.0005% of Magnafloc anionic flocculant was added to the liquor.

The color of the liquor was measured at 420 nm. and the percent decolorization was calculated for each run, as in the previous examples. The results are shown in Table 2.

TABLE 2

| Run | Surfactant | Color | Decolorization, percent |
|---|---|---|---|
| Control | Untreated liquor | 1,153 | |
| 1 | Talofloc | 579 | 49 |
| 2 | Bitran H | 615 | 47 |
| 3 | Morpan CW | 770 | 33 |
| 4 | Catafor O5 | 807 | 30 |

EXAMPLES 7–10

Relationship between chemical structure and decolorization activity

These examples were carried out to investigate the effect on decolorization activity of altering various parts of the molecule in quaternary cationic surfactants. The surfactants were divided into four groups, for the purposes of this investigation, and were used in conjunction with a conventional phosphatation process.

All of the test runs were made on a liquor prepared from Jamaican affined sugar. The liquor was treated with the required amount of each surfactant, with phosphoric acid to a concentration of 2 mM (equivalent to 0.0184% $P_2O_5$ on solids) and limed to about pH 8, giving a final liquor concentration of about 60° Brix. The treated liquor was heated at 80° C. in a water bath for one hour and then centrifuged, the supernatant finally being polish filtered through two Whatman 42 papers precoated with Dicalite Special Speedflow kieselguhr. The colors of the filtrates were measured in milliabsorbancy units, in the normal way, at pH 3.5.

The following results were obtained for each group of surfactants, respectively.

EXAMPLE 7

Five different n-alkyl trimethyl ammonium bromides of formula:

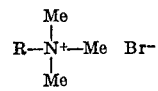

were tested at various concentrations. The results obtained are shown in FIG. 3 of the accompanying drawings. For comparison, a twin $C_{10}$ alkyl derivative, didecyl dimethyl ammonium bromide, was also tested, and the results for this are also shown in FIG. 3. The results show that activity increases with increasing alkyl chain length, but that there is little difference between surfactants containing 16 or more alkyl carbon atoms in a single chain. The results also show that the color is redissolved when these surfactants are used at high concentrations. The didecyl derivative gave a much lower color at higher concentrations.

EXAMPLE 8

Two members of the group of n-alkyl benzyl dimethyl ammonium chloride surfactants were studied, having the formula:

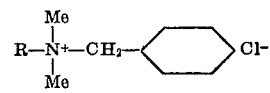
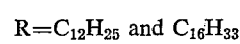

The results obtained are shown in FIG. 4 of the accompanying drawings. It will be seen that these results are broadly in accordance with those obtained in the preceding example, the $C_{16}$ derivative giving greater decolorization than the $C_{12}$.

EXAMPLE 9

In this example, the length of the alkyl chain was kept constant at $C_{16}$, so as to examine the effect of other substituents on the quaternary nitrogen atom. The compounds tested were the cetyl trimethyl, cetyl benzyl dimethyl and cetyl pyridinium salts. The results obtained are shown in FIG. 5 of the accompanying drawings, from which it will be seen that the three surfactants behaved similarly, all three showing good initial decolorization with increasing concentration, but then redissolving precipitated color as the concentration increased beyond a certain point.

EXAMPLE 10

A range of ethoxylated octadecyl quaternaries was tested, having the formula:

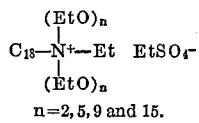

$$C_{18}-\overset{(EtO)_n}{\underset{(EtO)_n}{N^+}}-Et \quad EtSO_4^-$$

n=2, 5, 9 and 15.

The ethylene oxide groups are hydrophilic in character, thereby tending to reduce the overall lipophilic character of the molecule; and the results shown in FIG. 6 of the accompanying drawings indicate increasing decolorizing activity with decreasing value for $n$. The compounds consequently exhibit an increase in decolorizing activity with an increase in lipophilic character; and it will also be seen that the maximum degree of decolorization is obtained at greater concentrations of surfactant, as the lipophilic character increases.

For comparison between the various groups of surfactants used in above Examples 7 to 10, the most effective members of each group are shown together in Table 3. The surfactants used are cross-referenced to the accompanying drawings by means of the curve numbers.

TABLE 3

| Curve | Surfactant Type | Concentration (μeq./g. solids) | Color, mau | Decolorization, percent |
|---|---|---|---|---|
| 35 | $C_{20}N(Me)_3$ | 1.0 | 95 | 62 |
| 36 | $(C_{10})_2N(Me)_2$ | 3.8 | 49 | 80 |
| 42 | $C_{16}NBz(Me)_2$ | 1.0 | 82 | 67 |
| 53 | $C_{16}NPy$ | 1.0 | 79 | 68 |
| 64 | $C_{18}NEt(EtO)_2$ | 2.7 | 90 | 64 |

The systematic investigations of Examples 7 to 10 indicate that, in choosing a cationic surfactant of maximum decolorizing activity, the molecule should be as lipophilic as possible, either by inclusion of aromatic groups or by reduction of hydrophilic and polar groups; and that the molecule should preferably contain at least one n-alkyl chain of not less than 16 carbon atoms or, more effectively, two chains of about half that length or over.

EXAMPLE 11

Conventional phosphatation compared with phosphatation in combination with cationic surfactant of the pyridinium type This example shows the advantages of using phosphatation treatment in conjunction with surfactant treatment, in accordance with the present invention, as opposed to conventional phosphatation alone. The surfactant used is Morpan C.P.B.

A 65% solids Jamaican affined sugar liquor, having a color of 400 mau at 420 nm., was used. In the first run, conventional phosphatation was carried out, using phosphoric acid and hydrated lime. In the second run, the cationic surfactant was added before phosphatation. Treatment was carried out at about 80° C. After this treatment, the liquor was allowed to stand, the precipitate was filtered off, and the color of the filtrate was measured at 420 nm. The results obtained are shown in Table 4.

TABLE 4

| Run | Morpan CPB (percent on solids) | Phosphoric acid (percent $P_2O_5$ on solids) | Color, mau | Decolorization, percent |
|---|---|---|---|---|
| 1 | None | 0.02 | 284 | 29 |
| 2 | 0.04 | 0.02 | 102 | 75 |

EXAMPLE 12

Comparison of tertiary surfactants in combination with phosphatation

This example illustrates the use of four different tertiary amine cationic surfactants, used together with a phosphatation process.

The liquor used was a 65% solids Jamaican affined sugar liquor, having a color of 400 mau at 420 nm. In each run, the surfactant was used at a concentration of 0.15% on the basis of liquor solids, phosphoric acid was added in an amount equivalent to 0.02% $P_2O_5$ on solids, and hydrated lime was added to give a liquor pH of 7.6. The liquor was treated at a temperature of 80° C. The liquor was allowed to stand for a period of time, the precipitate was filtered off, and the color of the filtrate was measured at 420 nm. The results obtained are shown in Table 5.

TABLE 5

| Run | Surfactant | Color, mau | Decolorization, percent |
|---|---|---|---|
| 1 | Bitran HDA | 196 | 51 |
| 2 | Bitran H | 255 | 36 |
| 3 | Gemex 220 | 257 | 36 |
| 4 | Gemex G | 250 | 38 |

EXAMPLE 13

Defecation/decolorization by surfactants alone

This example illustrates the effect of using four different cationic surfactants, without any other defecation or decoloration treatment.

8 test runs were carried out by adding each of the four surfactants at two different concentrations, 0.25% and 0.025% on liquor solids, to samples of a 65% solids Jamaican affined sugar liquor having a color of 400 mau at 420 nm. The liquor was held at 80° C. for 45 minutes and then allowed to stand at room temperature for a further period of time. The precipitate was filtered from the liquor and the color of the filtrate measured at 420 nm. The results obtained are shown in Table 6.

TABLE 6

| Run | Surfactant Type | Concentration (percent on solids) | Color, mau | Decolorization, percent |
|---|---|---|---|---|
| 1 | Bitran H | 0.025 | 220 | 45 |
| 2 [1] | Bitran H | 0.25 | 292 | 27 |
| 3 | Gemex 220 | 0.025 | 153 | 62 |
| 4 | Gemex 220 | 0.25 | 127 | 68 |
| 5 | Gemex G | 0.025 | 189 | 53 |
| 6 [1] | Gemex G | 0.25 | 291 | 27 |
| 7 [1] | Gemex Z-11 | 0.025 | 249 | 38 |
| 8 [1] | Gemex Z-11 | 0.25 | 364 | 9 |

[1] In the case of runs 2, 6, 7 and 8, the poor decolorization is attributable to the very fine particles of precipitate passing through the filter medium. As has already been explained, when the cationic surfactant treatment is carried out without any conventional defecation treatment, it is extremely difficult to remove the very fine precipitate by simple filtration.

EXAMPLE 14

Decolorization by dialkyl quaternaries

In this example, the activity of three dialkyl quaternaries having different chain lengths was investigated, without using any other defecation or decolorization treatment.

The general procedure of Example 13 was followed, using a liquor having a color of 1098 mau at 420 nm. Each surfactant was tested at three different concentrations; and, after filtering off the precipitate produced, the color of the treated liquor was measured in the usual way. The results are shown in Table 7.

TABLE 7

[All surfactants are of general formula $R_2N(CH_3)_2Cl$]

| | Surfactant | | | |
|---|---|---|---|---|
| Run | Type | Concentration (percent on solids) | Color, mau | Decolorization, percent |
| 1 | $R=C_{12}$ | 0.02 | 756 | 31 |
| 2 | $R=C_{12}$ | 0.05 | 473 | 57 |
| 3 | $R=C_{12}$ | 0.1 | 558 | 49 |
| 4 | $R=C_{16}$ | 0.02 | 719 | 35 |
| 5 | $R=C_{16}$ | 0.05 | 469 | 57 |
| 6 | $R=C_{16}$ | 0.1 | 415 | 62 |
| 7 | Talofloc | 0.02 | 694 | 37 |
| 8 | Talofloc | 0.05 | 463 | 58 |
| 9 | Talofloc | 0.1 | 354 | 68 |

These results can be compared with those obtained in Example 7. The $C_{12}$ dialkyl (runs 1, 3 in Table 7) shows decolorization versus surfactant concentration passing through a maximum before further addition of surfactant results in an increase in color level, as happens also with the monoalkyls and $C_{10}$ dialkyl of Example 7; but the $C_{16}$ dialkyl and $C_{18}$ dialkyl (Talofloc), shown in runs 4-9 of Table 7, give a steady drop in color level with increasing surfactant concentration.

EXAMPLE 15

Decolorization by trialkyl and tetraalkyl quaternaries

The decolorization activity of several trialkyl and tetraalkyl quaternaries was investigated, using the same procedure as in Example 14. Each surfactant was used at a concentration of 0.05% on solids. The results obtained are shown in Table 8. The first group of tests (runs 1-3) compares the activity of the $C_{18}$ trialkyl with the $C_{18}$ monoalkyl and the $C_{18}$ dialkyl (Talofloc). Runs 4 and 5 compare the $C_8$ trialkyl with the $C_8$ dialkyl; and runs 6-9 compare four different tetraalkyls of increasing hydrocarbon chain length. A general increase in activity with increasing chain length is observed.

TABLE 8

| Run | Surfactant | Decolorization, percent |
|---|---|---|
| 1 | $C_{18}H_{37}N(Me)_3Br$ | 56 |
| 2 | Talofloc | 62 |
| 3 | $(C_{18}H_{37})_3NMeCl$ | 55 |
| 4 | $(C_8H_{17})_2N(Me)_2Br$ | 37 |
| 5 | $(C_8H_{17})_3NMe\ Cl$ | 40 |
| 6 | $(C_2H_5)_4NI$ | 7 |
| 7 | $(C_4H_9)_4N\ Br$ | 11 |
| 8 | $(C_5H_{11})_4N\ Br$ | 27 |
| 9 | $(C_6H_{13})_4N\ Br$ | 34 |

EXAMPLE 16

Synergistic combinations of quaternary and tertiary surfactants

This example shows the synergistic decolorization effect which may be obtained by using a quaternary cationic surfactant such as Talofloc in combination with various tertiary cationics.

The tests were performed on a 65% solids Jamaican affined sugar syrup having a color of 400 mau at 420 nm. The surfactants were added to the liquor at 80° C., at the concentrations shown in Table 9; the liquor was allowed to stand for a period of time; the precipitate formed was filtered off, using a fine kieselguhr filter aid with a pore leakage diameter of 0.4 μm.; and the color of the filtrate was measured at 420 nm. The results are shown in Table 9.

TABLE 9

| | Talofloc concentration (percent on solids) | Tertiary surfactant | | | |
|---|---|---|---|---|---|
| Run | | Type | Concentration (percent on solids) | Color | Decolorization, percent |
| 1 | 0.25 | None | | 91 | 77 |
| 2 | 0.25 | Catafor O2 | 0.02 | 64 | 84 |
| 3 | 0.25 | ...do | 0.05 | 69 | 83 |
| 4 | 0.25 | ...do | 0.07 | 70 | 83 |
| 5 | 0.25 | ...do | 0.10 | 57 | 86 |
| 6 | 0.25 | Catafor O5 | 0.05 | 73 | 82 |
| 7 | 0.25 | Ethomeen 18/60 | 0.02 | 88 | 78 |
| 8 | 0.25 | ...do | 0.05 | 73 | 82 |
| 9 | 0.25 | ...do | 0.20 | 210 | 48 |

The results show that even a very small amount of added tertiary surfactant has a marked affect on the decolorization of the liquor.

EXAMPLE 17

Factory phosphatation/flotation

A raw sugar factory used a remelt and phosphatation process to produce a liquor from which white sugar could be boiled. No filtration was used and considerable carry-over of phosphate floc from the clarifiers occured, giving rise to a white sugar of poor color.

The process was modified by adding Talofloc to the melter tank and a small amount of anionic flocculant (8 p.p.m. of Magnafloc LT25) to the feed to the clarifiers. The color and clarity of the resulting liquor improved outstandingly; and the flotation in the clarifiers was so rapid that the throughput could be trebled, thus reducing the residence time from 1 hour to 20 minutes. At the same time, the clarifier temperature was lowered from 95° C. to 80° C.

Comparative process details are given in Table 10.

TABLE 10

| Process parameter | Old process: 0.04% $P_2O_5$ only | New process: 0.05% $P_2O_5$ plus 0.05% Talofloc |
|---|---|---|
| Melter liquor color, mau | 2,000 | 2,000 |
| Clarified liquor color, mau | 1,810 | 1,000 |
| Clarifier temperature, °C | 95 | 80 |
| Clarifier residence time, min | 60 | 23 |
| Typical white sugar color, mau | 410 | 70 |

EXAMPLE 18

Factory phosphatation/flotation and bone char decolorization

A refinery was operating a conventional phosphatation process, using Jacobs clarifiers to clarify the treated liquor, followed by filtration and bone char decolorization, before boiling to give white sugar.

Talofloc was added to the refinery melter, at a concentration of 0.07% on solids, and 5 p.p.m. of Magnafloc was added to the liquor at the clarifier entry point. The effect was spectacular, in that clarification and color improved markedly, the clarifier throughput could be trebled, and the clarifier temperature could be reduced. The improved quality of the liquor entering the charhouse enabled longer running times to be obtained from the char cisterns. The improved clarification enabled less filter-aid to be used and longer press cycles to be run.

Comparative process details are shown in Table 11.

TABLE 11

| Process parameter | Old process: 0.02% $P_2O_5$ only | New process: 0.02% $P_2O_5$ plus 0.07% Talofloc |
|---|---|---|
| Melter liquor color, mau | 900 | 900 |
| Clarified liquor color, mau | 750 | 320 |
| Fine liquor color (off char) mau | 350 | 210 |
| White sugar color, mau | 23 | 14 |
| Clarifier temperature, °C | 95 | 80 |
| Clarifier residence time, min | 72 | 25 |
| Filter aid used in pressing, percent | 0.3 | 0.10 |
| Press cycle time, hours | 8 | 24 |
| Char cistern running time, hours | 30 | 96 |

EXAMPLE 19

Laboratory carbonatation

Liquors obtained from three different sugars were subjected to conventional carbonatation and to treatment with Talofloc in combination with carbonatation, in a laboratory apparatus which simulated a refinery carbonatation plant. After treatment, the liquor was filtered and its color measured at 420 nm. The results obtained are shown in Table 12, which also shows color measurements on each liquor before treatment.

TABLE 12

| Run | Sugar origin | Talofloc (percent on solids) | Lime used (percent on solids) | Color, mau | Decolorization, percent |
|---|---|---|---|---|---|
| Control | West Indies Sugar (A). | Untreated liquor | | 1,150 | |
| 1 | | None | 0.5 | 774 | 33 |
| 2 | | 0.025 | 0.5 | 513 | 55 |
| 3 | | 0.050 | 0.5 | 340 | 70 |
| Control | West Indies Sugar (B). | Untreated liquor | | 1,086 | |
| 4 | | None | 0.5 | 750 | 31 |
| 5 | | 0.025 | 0.5 | 589 | 46 |
| 6 | | 0.050 | 0.5 | 476 | 56 |
| Control | Mixed: 50% Mauritius, 50% Beet. | Untreated liquor | | 717 | |
| 7 | | None | 0.5 | 479 | 33 |
| 8 | | 0.050 | 0.5 | 237 | 67 |

EXAMPLE 20

Effect of cationic surfactant on filtrability in carbonatation process

The improvement in the filtrability of carbonatation precipitates, conferred by the use of a cationic surfactant in accordance with the present invention, is illustrated by the following runs.

In each run, a liquor obtained from an African sugar was treated by a conventional carbonation process, operating at 80° C., with a retention time of 1 hour, and with lime addition corresponding to 0.6% CaO on liquor solids. In the first run, no surfactant was added to the liquor. Subsequent runs were performed with the addition of increasing amounts of Talofloc surfactant to the carbonatation tank. The filtrability of the defecated liquor produced in each run was measured and the results are shown in Table 13. The results are expressed in terms of "filtrability index," which is a directly proportional measure of filtrability: for an explanation of the measurement and calculation of the filtrability index, see M. C. Bennett, "liquor Carbonatation: Part 1—Impurity Effects on Filtrability," International Sugar Journal, 69 (1967), pages 101–104.

TABLE 13

| Run | Talofloc (percent on solids) | Filtrability index |
|---|---|---|
| 1 | None | 6.2 |
| 2 | 0.01 | 7.2 |
| 3 | 0.02 | 8.3 |
| 4 | 0.03 | 14.3 |
| 5 | 0.04 | 15.1 |

EXAMPLE 21

Effect of cationic surfactant on filtrability in carbonation

The procedure of Example 20 was repeated, using a liquor prepared from a different African sugar, but under the same carbonatation conditions. The first run was performed without any addition of surfactant and the second run with the addition of Talofloc surfactant. The filtrability index was calculated as in Example 20 and the results are shown in Table 14.

TABLE 14

| Run | Talofloc (percent on solids) | Filtrability index |
|---|---|---|
| 1 | None | 3.0 |
| 2 | 0.02 | 6.4 |

EXAMPLE 22

Refinery carbonatation and bone char decoloraization

A refinery was operating a conventional carbonatation process, followed by filtration and bone char decolorization.

Talofloc was added to the refinery melter, at a concentration of 0.05% on sugar solids. The precipitated color-Talofloc complex was removed together with the normally-precipitated chalk in the conventional filtration process. Considerably lighter-colored brown and fine liquors were produced, as shown in Table 15.

TABLE 15

| Process parameter | Old process: carbonatation only | New process: carbonation plus 0.05% Talofloc |
|---|---|---|
| Melter liquor color, mau | 1,300 | 1,300 |
| Filtered brown liquor color, mau | 860 | 450 |
| Fine liquor color, mau | 200 | 60 |
| White sugar color (1st boiling), mau | 16 | 5 |

EXAMPLE 23

Effect of cationic surfactant on resin decolorization

This example illustrates the effect of using cationic surfactant, in accordance with the present invention, on subsequent decolorization using ion-exchange resin.

From a standard mixed melter liquor (Mauritius Cane and British Beet) having a color of 797 mau, three defecated liquors were prepared as follows:

(a) standard carbonatation at 0.5% CaO—color 532 mau
(b) standard phosphatation at 0.05 $P_2O_5$—color 473 mau
(c) phosphatation in the presence of 0.05% TALOFLOC, in accordance with the invention—color 257 mau.

These three liquors were passed over anion exchange resin type IRA 401 S (Rohm and Haas), in the manner conventionally used for liquor decolorization. The resins were regenerated after each 40 bed volumes of liquor had been passed through them, in the known manner, with sodium chloride solution. 20 such decolorization/regeneration cycles were performed.

The colors of the various liquors obtained from each resin column are shown in FIG. 7 of the accompanying drawings, plotted against the number of resin cycles. Curve 71 is in respect of liquor (a) defecated by carbonatation alone; curve 72 is in respect of liquor b) defecated by phosphatation alone; and curve 73 is in respect of liquor (c) defecated by the use of Talofloc in combination with phosphatation, in accordance with the invention. It will be seen that the two conventionally defecated liquors show quite steeply rising color curves, indicating that the resin is becoming progressively fouled. In contrast, the liquor defecated by the process using Talofloc shows substantially constant color after the first four cycles, indicating that the adsorbed color is being completely removed from the resin during regeneration.

I claim:
1. A process for purifying a sugar liquor comprising: adding a cationic surfactant to an undefecated melter liquor containing an anionic high molecular weight impurity, so as to form an insoluble complex between the cationic surfactant and the anionic impurity; and
separating said insoluble complex from the liquor.
2. The process of claim 1, in which the amount of cationic surfactant incorporated in the liquor is in the range of 0.005%–0.5% by weight based on liquor solids.
3. The process of claim 1, in which the said surfactant is selected from the group consisting of dihexadecyldimethyl quaternary ammonium compounds, dioctadecyl dimethyl quaternary ammonium compounds, and mixtures thereof.
4. The process of claim 1, in which the said surfactant is selected from the group consisting of long hydrocarbon chain quaternary ammonium compounds, long hydrocarbon chain tertiary amines and long hydrocarbon chain pyridinium compounds.
5. The process of claim 4, in which the said surfactant is a dialkyl dimethyl quaternary ammonium compound wherein one at least of the alkyl groups contains at least 8 carbon atoms.
6. The process of claim 4, in which the said surfactant comprises a mixture of a long hydrocarbon chain tertiary amine with a long hydrocarbon chain quaternary ammonium compound.
7. A process for simultaneously defecating and decolorizing a sugar liquor, which process comprises:
adding a cationic surfactant to an undefecated melter liquor containing an anionic high molecular weight impurity;
then forming an inorganic precipitate in the liquor in the presence of said cationic surfactant; and
separating the precipitate from the liquor.
8. The process of claim 7, in which the inorganic precipitate is calcium carbonate.
9. The process of claim 8, in which the said surfactant is selected from the group consisting of dihexadecyl dimethyl quaternary ammonium compounds, dioctadecyl dimethyl quaternary ammonium compounds, and mixtures thereof.
10. The process of claim 7, in which the inorganic precipitate is calcium phosphate.
11. The process of claim 10, in which the precipitate is separated from the liquor by flotation.
12. The process of claim 10, in which the said surfactant is selected from the group consisting of dihexadecyl dimethyl quaternary ammonium compounds, dioctadecyl dimethyl quaternary ammonium compounds and mixtures thereof.

References Cited

UNITED STATES PATENTS

| | | | |
|---|---|---|---|
| 3,166,442 | 1/1965 | Duke | 127—48 |
| 2,518,296 | 8/1950 | Eguchi | 127—57 X |
| 2,546,179 | 3/1951 | Paine | 127—46 R X |
| 3,054,678 | 9/1962 | Michener | 99—150 |
| 3,130,082 | 4/1964 | Serbia | 127—46 A |
| 1,876,491 | 9/1932 | Foster | 127—50 |
| 1,195,566 | 4/1934 | Foster | 127—50 X |
| 2,774,693 | 12/1956 | Brieghel-Muller | 127—50 |
| 2,977,253 | 3/1961 | Rene | 127—50 |
| 3,089,789 | 5/1963 | Van Note | 127—50 |

FOREIGN PATENTS 1,073,979  1/1960  Germany.

OTHER REFERENCES

Chemical Abstracts 60: 3184a–b (1964).
Chemical Abstracts 52: 12272i (1958).
Chemical Abstracts 58: 4721d (1963).

MORRIS O. WOLK, Primary Examiner

S. MARANTZ, Assistant Examiner

U.S. Cl. X.R.

127—46 R; 210—54